United States Patent [19]
Hatano et al.

[11] Patent Number: 5,090,794
[45] Date of Patent: Feb. 25, 1992

[54] METHOD FOR DRIVING A MULTI-LAYERED-TYPE LIQUID CRYSTAL DISPLAY DEVICE

[75] Inventors: Akitsugu Hatano; Yutaka Ishii, both of Nara, Japan

[73] Assignee: Sharp Kabushiki Kaisha, Osaka, Japan

[21] Appl. No.: 439,876

[22] Filed: Nov. 21, 1989

[30] Foreign Application Priority Data

Nov. 21, 1988 [JP] Japan .................... 63-294373

[51] Int. Cl.⁵ .................................. G02F 1/13
[52] U.S. Cl. ............................. 359/53; 359/85; 359/93
[58] Field of Search ............... 350/335, 347 E, 347 R, 350/332

[56] References Cited

U.S. PATENT DOCUMENTS

| | | | |
|---|---|---|---|
| 4,241,339 | 12/1980 | Ushiyama et al. | 350/335 |
| 4,396,250 | 8/1983 | Wada et al. | 350/335 |
| 4,443,065 | 4/1984 | Funada et al. | 350/335 |
| 4,460,248 | 7/1984 | Shirai | 350/335 |
| 4,556,286 | 12/1985 | Uchida et al. | 350/335 |
| 4,653,865 | 3/1987 | Kando et al. | 350/347 E |
| 4,904,058 | 2/1990 | Kato et al. | 350/335 |
| 4,941,737 | 7/1990 | Kimura | 350/335 |

FOREIGN PATENT DOCUMENTS

| | | |
|---|---|---|
| 0246842 | 11/1987 | European Pat. Off. . |
| 0284372 | 9/1988 | European Pat. Off. . |
| 0036802 | 3/1980 | Japan .................. 350/335 |
| 0067817 | 6/1981 | Japan .................. 350/335 |
| 0019123 | 1/1985 | Japan .................. 350/335 |
| 62-283684 | 11/1987 | Japan . |
| WO8903542 | 4/1989 | PCT Int'l Appl. . |

OTHER PUBLICATIONS

"Multicolor Display by Double-Layered Supertwisted-Nematic LCD", to Kimura et al.
"New Multicolor Liquid Crystal Displays that Use a Twisted Nematic Electro-Optical Cell", by Terry J. Scheffer, *J. Appl. Phys.*, vol. 44, No. 11, Nov. 73.
"Neutralized Supertwisted Nematic LCD: Principle and Characteristics", by Mitsuo Nagata et al., *The Transactions of the IEICE*, vol. E-71, No. 11, Nov. 88.

*Primary Examiner*—Rolf Hille
*Assistant Examiner*—Tan Ho

[57] ABSTRACT

A method for driving a multi-layered-type liquid crystal display device is disclosed. The liquid crystal display device includes a plurality of cell layers, and each cell layer contains liquid crystal molecules twisted between two transparent substrates so as to have a relatively large birefringence and having a light transmittance changing responsive to a voltage applied thereto. Voltages to be applied to respective cell layers are determined so as to pass a predetermined color light in combination of the light transmittances of individual cell layers. Further, these cell layers are driven by those voltages determined to display an image having the predetermined color light on the liquid crystal display device.

11 Claims, 8 Drawing Sheets

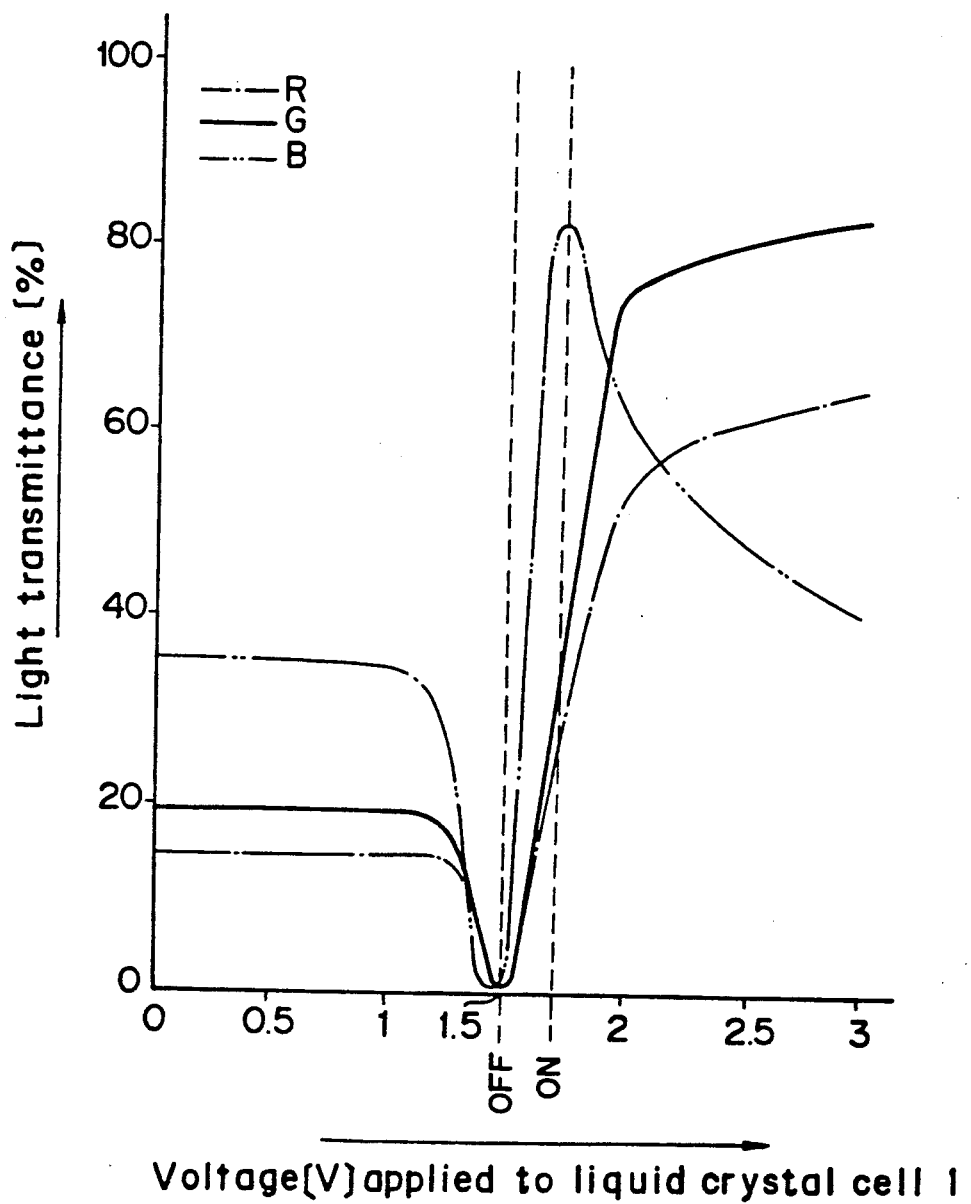

METHOD FOR DRIVING A MULTI-LAYERED-TYPE LIQUID CRYSTAL DISPLAY DEVICE

BACKGROUND OF THE INVENTION

1. Field of the Invention

The present invention relates to a method for driving a liquid crystal display device, and more particularly, to a method for driving multi-layered-type liquid crystal display device comprising stacked plural liquid crystal cells for passing lights of different colors therethrough.

2. Description of Related Art

Liquid crystal display devices are now being used widely used in various electronic apparatuses such as clocks and electronic calculating machines, displays of computer's terminals and word processors, television sets. Recently, there have been extremely high demands for constituting multicolor and full color displays using by liquid crystal display devices. Further, some are already put in practical use in the fields of graphic display and image display. The color display of this type is attained by arranging color filter layers inside of a liquid crystal cell as a light switcher in order to generate various colors. The major display mode of the liquid crystal display device is called a twisted nematic display mode (referred to as a TN display mode hereinafter), wherein liquid crystal molecules are twisted by an angle of 90° in the liquid crystal cell.

However, in the TN display mode, the dependency of the display characteristic on the wavelength of light is relatively large, and it is difficult to switch the light uniformly over the whole range of the visible light. Particularly, in a normally closed type liquid crystal display device in which the polarization axes of two polarizers are parallel to each other, coloring of the display may be caused due to leakage of the light when no voltage is applied to the liquid crystal layer. Therefore, it is difficult to adapt the TN display mode in a full color display.

In a color liquid crystal display device utilizing the TN display mode, wherein the aforementioned color filter layer are arranged, there have been mainly proposed the following two driving methods as methods for driving the color liquid crystal display device. One is an active matrix driving method, and another is a simple multiplex driving method.

In a liquid crystal display device utilizing the active matrix driving method, non-linear devices such as diodes or switching devices such as thin film transistors are provided at respective pixels of the liquid crystal cell, and the liquid crystal layer of each pixel is driven selectively.

In a liquid crystal display device utilizing the simple multiplex driving method, there are not provided non-linear devices or switching devices, and the liquid crystal layer of each pixel is driven sequentially. In this liquid crystal display device, a steepness near the threshold value gives a trouble among optical characteristics of the liquid crystal, in which the TN display mode is used.

In order to improve the optical characteristics exhibiting the steepness near the threshold value, there has been proposed a Super Twisted Nematic method (referred to as an STN method hereinafter) as a method for orienting liquid crystal molecules, wherein the twisted angle is set so as to have a value between 180° and 270°. In the STN method, the curve rises steeply in the vicinity of the threshold value, and it is possible to obtain a high contrast ratio even under a high duty ratio. However, because it utilizes the birefringence effect of the liquid crystal, the dependence of the display characteristics on the wavelength of light is higher than that of the TN display. Thereby, coloring of the display becomes much more severe.

Furthermore, in order to display a multicolor image, generally, a color filter layer is provided as described above. In this case, however, there are such problems that the manufacturing process therefor is complicated and the manufacturing cost increases.

SUMMARY OF THE INVENTION

An essential object of the present invention is to provide a method for driving a multi-layered-type liquid crystal display device, which is capable of displaying multicolor images in a high quality without using any color filter.

In order to accomplish the above object, according to the present invention, there is provided a method for driving a multi-layered-type liquid crystal display device comprising stacked plural cell layers, each said cell layer containing liquid crystal molecules twisted between two transparent substrates so as to have a relatively large birefringence and having a light transmittance changing responsive to a voltage applied thereto. The method is characterized in that voltages to be applied to respective cell layers are determined so as to pass a predetermined color light in combination of the light transmittances of individual cell layers, and that these cell layers are driven by those voltages determined to display an image having said predetermined color light on said liquid crystal display device.

BRIEF DESCRIPTION OF THE DRAWINGS

These and other objects and features of the present invention will become clear from the following description taken in conjunction with the preferred embodiments thereof with reference to the accompanying drawings, in which:

FIG. 4b is a graph of R, G and B characteristic curves showing a relation between a voltage applied to the liquid crystal cell layer 1 and a light transmittance when no voltage is applied to the liquid crystal cell layer 2 in the double-layered-type liquid crystal display device of the first preferred embodiment;

DETAILED DESCRIPTION OF THE PREFERRED EMBODIMENTS

Preferred embodiments according to the present invention will be described below with reference to the attached drawings.

First Preferred Embodiment

Figure 1:
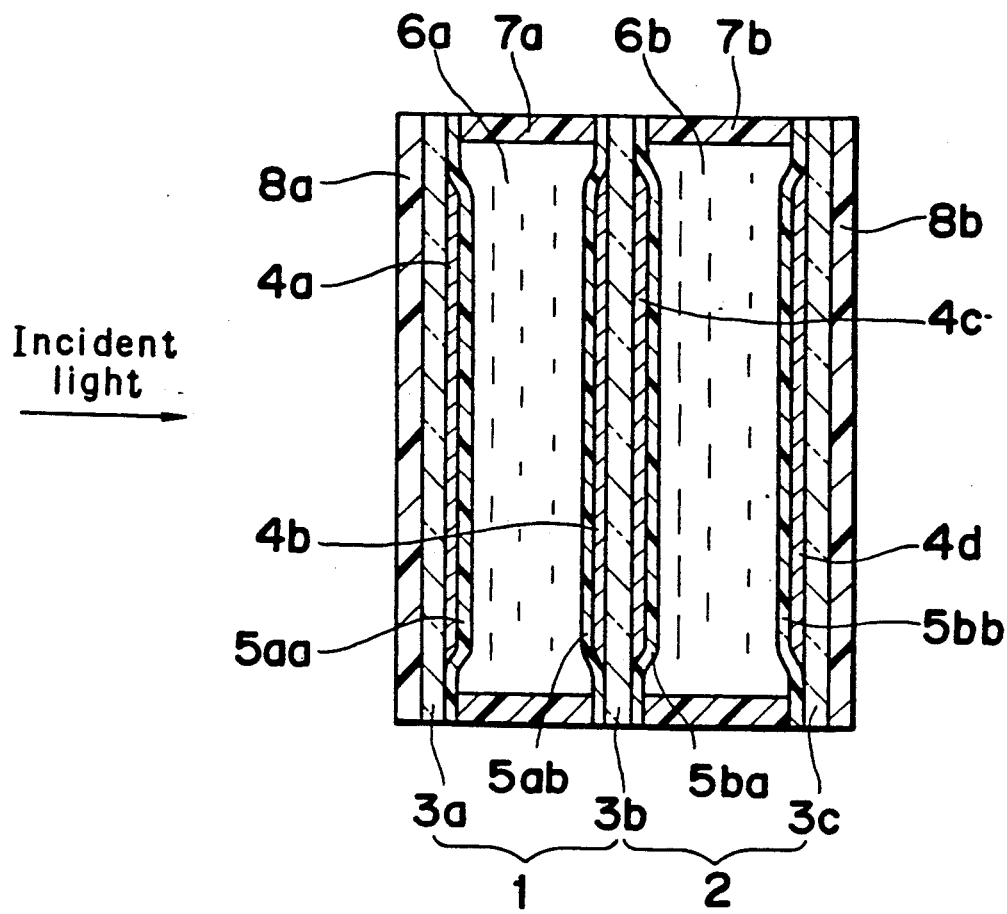
FIG. 1 is a cross sectional view showing a fundamental structure of a double-layered-type liquid crystal display device of preferred embodiments according to the present invention.

FIG. 1 is a cross sectional view showing a fundamental structure of a double-layered-type liquid crystal device to which there is applied a driving method of a first preferred embodiment according to the present invention.

Referring to FIG. 1, the liquid crystal display device has a double layered structure composed of first and second cell layers 1 and 2, containing liquid crystal layers 6a and 6b, respectively. In the liquid crystal layers 6a and 6b, liquid crystal molecules are arranged in a twisted nematic phase.

The first and second cell layers 1 and 2 are formed so as to be stacked on both surfaces of a common transparent substrate 3b. The first cell layer 1 has such a structure that the liquid crystal layer 6a is contained between two transparent substrates 3a and 3b and is sealed by a sealing element 7a, and orientation membranes 5aa and 5ab for orienting liquid crystal molecules in a twisted nematic phase are formed on respective inner surfaces of the transparent substrates 3a and 3b. The first cell layer 1 has transparent electrical conductive electrode films 4a and 4b for applying a voltage to the liquid crystal layer 6a, which are formed on respective inner surfaces of the transparent substrates 3a and 3b. Further, there is formed a polarizer 8a on the outer surface of the outer substrate 3a.

The second cell layer 2 has such a structure that the liquid crystal layer 6b is contained between two transparent substrates 3b and 3c and is sealed by a sealing element 7b, and orientation membranes 5ba and 5bb for orienting liquid crystal molecules in a twisted nematic phase are formed on respective inner surfaces of the transparent substrates 3b and 3c.

The second cell layer 2 has transparent electrical conductive electrode films 4c and 4d for applying a voltage to the liquid crystal layer 6b, which are formed on respective inner surfaces of the transparent substrates 3b and 3c. Further, there is formed a polarizer 8b on the outer surface of the outer substrate 3c so that the polarization axes of the polarizers 8a and 8b cross each other at an angle in the range from zero to 30°.

Each of the transparent substrates 3a to 3c may be made of glass, acrylic resin, or the like, and each of the transparent electrode films 4a to 4c may be made of ITO which is a film mainly made of indium oxide, a nesa film, or the like. Each of the orientation membranes 5aa, 5ab, 5ba and 5bb may be made of an inorganic material such as $SiO_2$, SiO, or the like or an organic material such as polyimide, polyvinyl alcohol, nylon, acrylic resin, or the like.

Figure 2A:
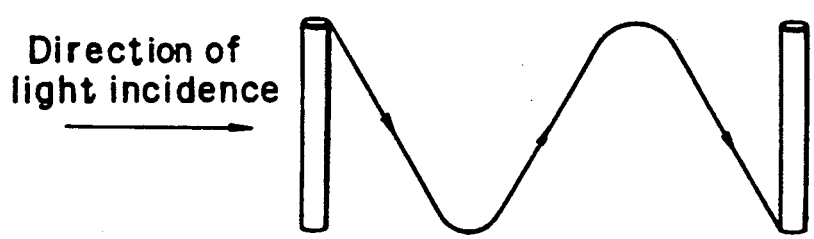
FIGS. 2a and 2b are diagrams schematically showing twists of liquid crystal molecules in left and right directions, respectively.
Figure 2B:
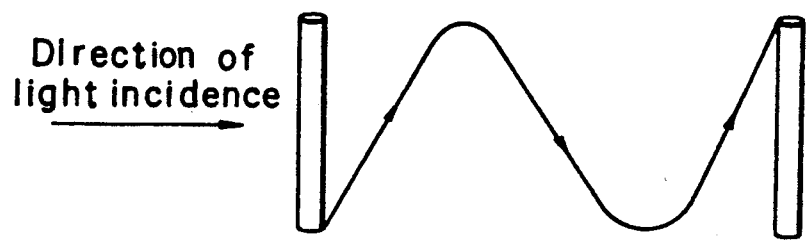

In the liquid crystal device shown in FIG. 1, the axes of respective liquid crystal molecules in each of the liquid crystal layers 6a and 6b are twisted helically from the side of one substrate to the side of another substrate of each cell layer, as shown schematically in FIGS. 2a and 2b. As is well known to those skilled in the art, the direction of twist is defined either a direction to the right (FIG. 2a) or a direction to the left (FIG. 2b). In order to give a twisting power to individual liquid crystal molecules, generally, at least one optically active material is added into the nematic liquid crystal. In the case of the right twist, for example, the material represented by the following general formula and offered by Merck & Co., Inc. is added thereinto.

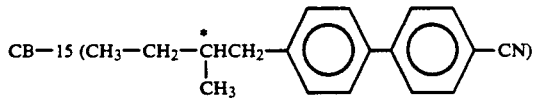

$$CB-15\ (CH_3-CH_2-\overset{*}{C}HCH_2-\underset{CH_3}{\big|}\!-\!\!\bigcirc\!\!-\!\!\bigcirc\!\!-CN)$$

On the other hand, in the case of the left twist, cholesteryl nonanoate S-811 ® offered by Merck & Co., Inc. is added thereinto.

In the double-layered-type liquid crystal display device, in order to enhance a contrast ratio in the case of a monochromatic display and a quality of the display in the case of a multicolor display, or the like, values $\theta_1$ and $\theta_2$ of twist angles of the liquid crystal layers 6a and 6b in the first and second cell layers 1 and 2, and the value $\Delta n_1 \cdot d_1$ of a product of the birefringence $\Delta n_1$ of the liquid crystal layer 6a and the thickness $d_1$ thereof and the value $\Delta n_2 \cdot d_2$ of a product of the birefringence $\Delta n_2$ of the liquid crystal layer 6b and the thickness $d_2$ thereof are adjusted so as to satisfy the following requirement.

(a) The values $\Delta n_1 \cdot d_1$ and $\Delta n_2 \cdot d_2$ are adjusted so as to satisfy the following inequalities (1) and (2) in order to obtain the aforementioned excellent display characteristics, which is confirmed by the experiment performed by the inventors of the present invention.

$$1.0 < |\Delta n_1 \cdot d_1| < 3.5 \tag{1}$$

$$1.0 < |\Delta n_2 \cdot d_2| < 3.5 \tag{2}$$

(b) In order to maximize the contrast ratio in the case of the monochromatic display, the values $\Delta n_1 \cdot d_1$ and $\Delta n_2 \cdot d_2$ are adjusted so as to satisfy the following inequality (3), which is confirmed by the experiment performed by the inventors of the present invention.

$$0.8 < \Delta n_2 \cdot d_2 / \Delta n_1 \cdot d_1 < 1.5 \tag{3}$$

(c) In order to display a monochromatic image by selectively applying an ON voltage for enabling light to pass through the liquid crystal layer 6a of the first cell layer 1 or an OFF voltage for disabling light to pass therethrough to the liquid crystal layer 6a under the condition that a predetermined voltage is applied to the liquid crystal layer 6a of the first cell layer 1, and also to display a multicolor image based on interference colors by selectively applying the aforementioned ON or OFF voltage to the liquid crystal layer 6a of the first cell layer 1, the values $\Delta n_1 \cdot d_1 \cdot \theta_1$ and $\Delta n_2 \cdot d_2 \cdot \theta_2$ are adjusted so as to satisfy the following inequality (4), which is confirmed by the experiment performed by the inventors of the present invention.

$$\Delta n_2 \cdot d_2 \cdot \theta_2 / \Delta n_1 \cdot d_1 \cdot \theta_1 > 0.9 \tag{4}$$

In order to display a monochromatic image by selectively applying the aforementioned ON or OFF voltage to the liquid crystal layer 6a of the first cell layer 1 under the condition that no voltage is applied to the liquid crystal layer 6b of the second cell layer 2, and also to display a multicolor image based on interference colors by selectively applying the aforementioned ON or OFF voltage to the liquid crystal layer 6a of the first cell layer 1, the values $\Delta n_1 \cdot d_1 \cdot \theta_1$ and $\Delta n_2 \cdot d_2 \cdot \theta_2$ are adjusted so as to satisfy the following inequality (5), which is confirmed by the experiment performed by the inventors of the present invention.

$$\Delta n_2 \cdot d_2 \cdot \theta_2 / \Delta n_1 \cdot d_1 \cdot \theta_1 < 1.1 \tag{5}$$

Figure 3:
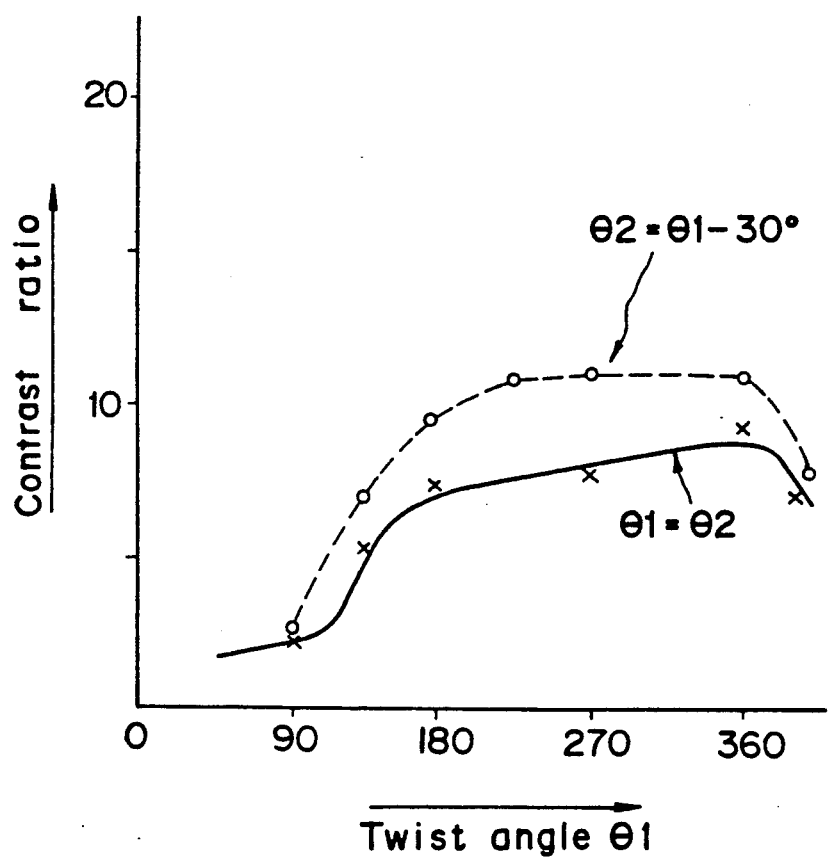
FIG. 3 is a graph of characteristic curves showing the relation between a twist angle $\theta_1$ of a liquid crystal layer of a double-layered-type liquid crystal and a contrast ratio of a displayed monochromatic image.

(d) FIG. 3 shows the relation between a twist angle $\theta_1$ of the liquid crystal layer 6a and a contrast ratio of a displayed monochromatic image in the double-layered-type liquid crystal device. As shown in FIG. 3, each contrast ratio of displayed monochromatic images in the case of $\theta_2 = \theta_1 - 30°$ is larger than that in the case of $\theta_1 = \theta_2$. Therefore, when the display contrast and the visibility are taken into consideration, the twist angle $\theta_1$ of the liquid crystal layer 6a of the first cell layer 1 is preferably set so as to fall in the arrange from about 180° to about 360°. If the twist angle $\theta_1$ exceeds 360°, domains appear in the liquid crystal layer 6a in which each liquid crystal has an orientation disarrayed at the time of the application of a predetermined voltage, resulting in a dispersion of light, which readily causes a decrease in the contrast.

Furthermore, when the display contrast is taken into consideration, the twist angle $\theta_2$ of the liquid crystal layer 6b of the second cell layer 2 is preferably set so as to fall in the range from about 30° to about 360° and to be different from the twist angle $\theta_1$ of the liquid crystal layer 6a of the first cell layer 1.

In order to obtain a steep threshold characteristic in the contrast, the specific pitch p of the helical twist of liquid crystal is considered to be very important. The ratio d/p of the thickness d of each of the liquid crystal layers 6a and 6b to the pitch p of the helical twist of the liquid crystal therein is preferably set so as to satisfy the following relation, which is confirmed by the experiment performed by the inventors of the present invention.

$$\theta/360° - \tfrac{1}{4} < d/p \leq \theta/360° \tag{6}$$

wherein $\theta$ is the twist angle of the liquid crystal. This requirement can be applied only to the case that the pretilt angle of the liquid crystal is equal to or smaller than about 10°. In the case that the pretilt angle thereof exceeds 10°, the range to be satisfied by the ratio d/p becomes different from the range represented by the inequality (6).

Figure 4A:
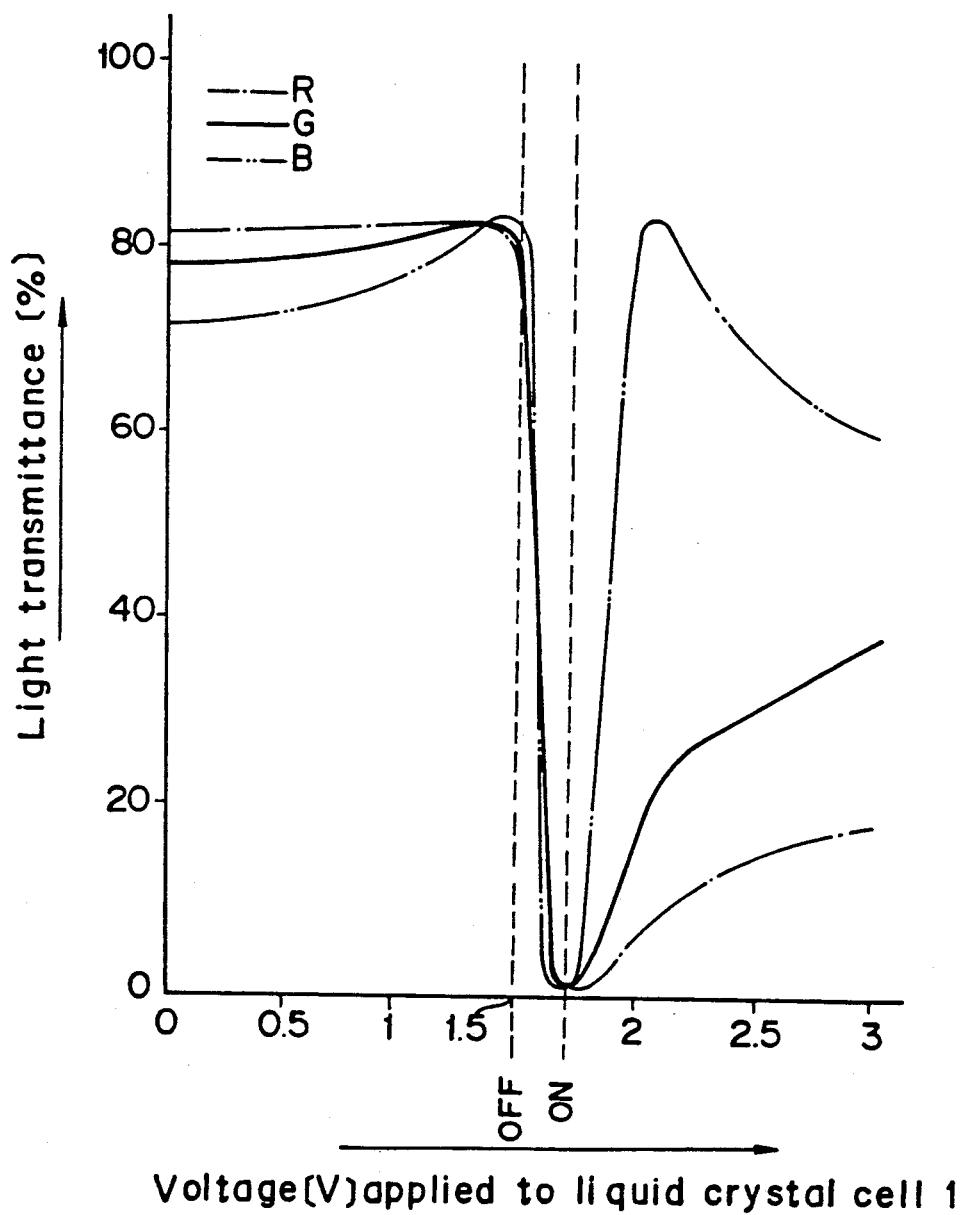
FIG. 4a is a graph of R, G and B characteristic curves showing a relation between a voltage applied to a liquid crystal cell layer 1 and a light transmittance when a voltage is applied to a liquid crystal cell layer 2 in the double-layered type liquid crystal display device of a first preferred embodiment.

FIGS. 4a and 4b are graphs of characteristic curves showing the relation between a voltage applied to the liquid crystal layer 6a of the first cell layer 1 and a light transmittance in the double-layered-type liquid crystal device shown FIG. 1, wherein FIG. 4a shows the characteristics in the case of a monochromatic display, and FIG. 4b shows the characteristics in the case of a multicolor display.

First of all, a method for driving the double-layered-type liquid crystal device so as to display a monochromatic image and the action thereof will be described below with reference to FIG. 4a.

Under the condition that a predetermined voltage is applied between the transparent electrode films 4c and 4d of the second cell layer 2 so as to be applied to the liquid crystal layer 6b, an ON voltage of about 1.7 V or an OFF voltage of about 1.5 V is selectively applied between the transparent electrode films 4a and 4b of the first cell layer 1 with use of a simple multiplex driving method so as to be applied to the liquid crystal layer 6a. Then, the orientation direction of the liquid crystal molecules on each pixel of an area of the liquid crystal layer 6a where the transparent electrode films 4a and 4b cross each other changes according to the voltage applied thereto. The light having passed through the first and second cell layers 1 and 2 passes through the polarizer 8b when the OFF voltage is applied to the liquid crystal layer 6a. On the other hand, the light having passed through the first and second layers 1 and 2 is shaded by the polarizer 8b when the ON voltage is applied thereto.

Namely, as shown in FIG. 4a, when red color light R having a wavelength of 610 nms, green color light G having a wavelength of 550 nms and blue color light B having a wavelength of 450 nms are incident substantially perpendicularly to the outer surface of the polarizer 8a from the outer side thereof to the liquid crystal device, they pass through each partial area of the polarizer 8b corresponding to each of a first group of pixels of the liquid crystal layer 6a to which the OFF voltage is applied. Then, a white color image is displayed on each of the first group of pixels. On the other hand, the red color light R, the green color light G and the blue color light B are shaded by each partial area of the polarizer 8b corresponding to each of a second group of pixels of the liquid crystal layer 6a to which the ON voltage is applied. Then, a black color image is displayed on each of the second group of pixels. Therefore, a monochromatic image composed of white and black color images is displayed on the double-layered-type liquid crystal device. In the double-layered-type liquid crystal device, the second cell layer 2 acts as a compensator for compensating a color tone of the light having passed through the first cell layer 1, resulting in an excellent monochromatic display without interference colors.

Next, a method for driving the double-layered-type liquid crystal device so as to display a multicolor image and the action thereof will be described below with reference to FIG. 4b.

Under the condition that no voltage is applied to the liquid crystal layer 6b of the second cell layer 2, the ON or OFF voltage is selectively applied to the liquid crystal layer 6a of the first cell layer 1 in the manner similar to the case of the aforementioned monochromatic display. Then, as shown in FIG. 4b, the red color light R, the green color light G and the blue color light B are shaded by each partial area of the polarizer 8b corresponding to each of a first group of pixels of the liquid crystal layer 6a to which the OFF voltage is applied. Then, a black color image is displayed on each of the first group of pixels. On the other hand, the light transmittance of only the blue color light B on each of a second group of pixels corresponding to the liquid crystal layer 6a to which the ON voltage is applied increases, and then, a blue color image is displayed on each of the second group of pixels. Therefore, a two-color image composed of black and blue color images is displayed on the double-layered-type liquid crystal device. Namely, the characteristic of the function for compensating the color tone of the second cell layer 2 changes by switching over from such a state that the predetermined voltage is applied to the liquid crystal layer 6b to such a state that no voltage is applied thereto, resulting in a change in the color of the displayed image.

If the second cell layer 2 is driven statically so as to switch over from such a state that the predetermined voltage is applied to the substantially whole area of the liquid crystal layer 6b to such a state that no voltage is applied thereto, the whole image surface of the double-layered-type liquid crystal device can be switched over from a monochromatic display for selectively displaying a white color image or a black color image thereon to a two-color display for selectively displaying a black color image or a blue color image thereon. Furthermore, by switching over from such a state that the predetermined voltage is applied to the whole area of the liquid crystal layer 6b of the second cell layer 2 corresponding to all the pixels to such a state that no voltage is applied only to a partial area of the liquid crystal layer 6b corresponding to any selected group of pixels with use of a simple multiplex driving method, a two-color image composed of black and blue color images is displayed on the selected group of pixels in such a state that a monochromatic display composed of white and black color images is displayed on the other groups of pixels, resulting in that a multicolor display on the whole surface of the double-layered-type liquid crystal device.

Second Preferred Embodiment

Figure 5A:
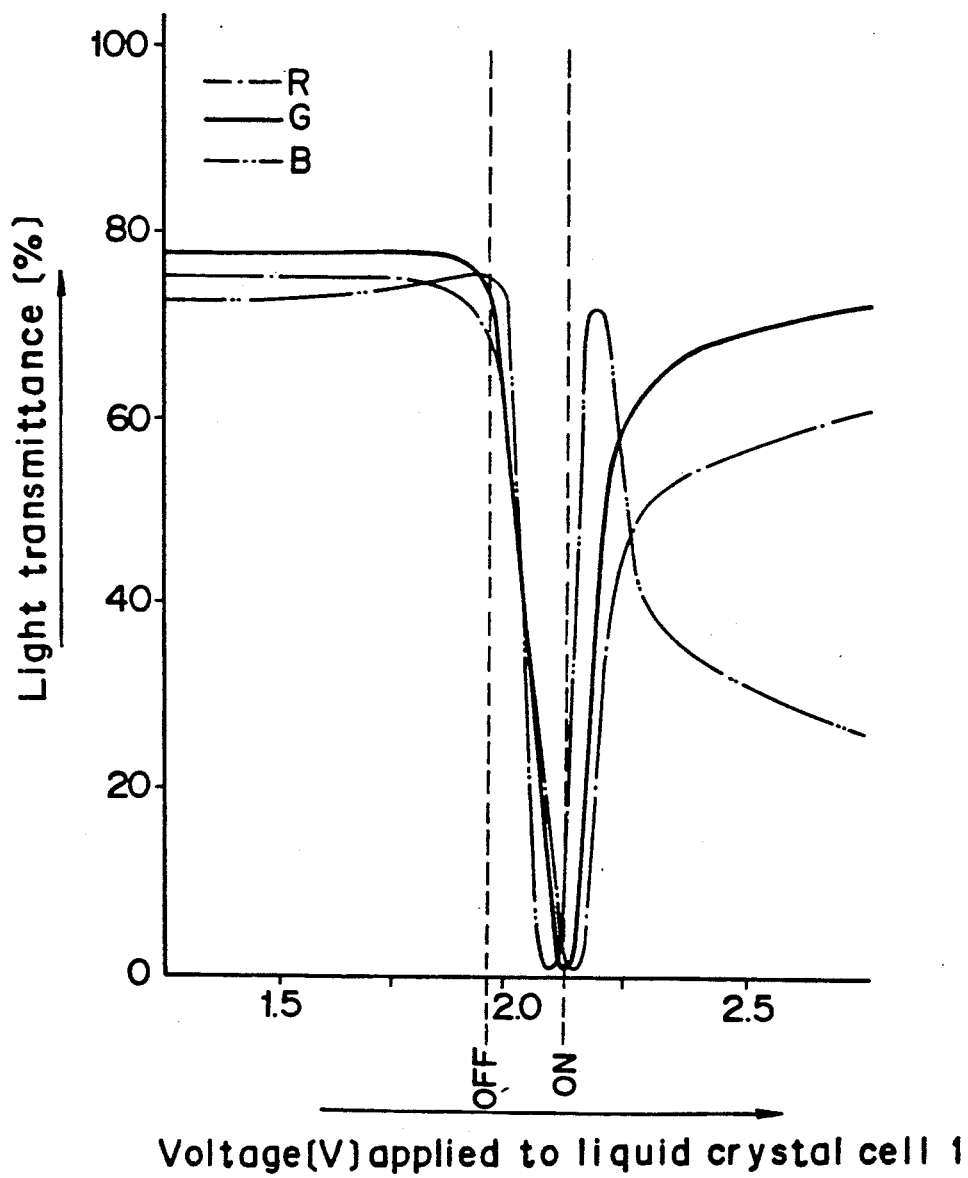
FIG. 5a is a graph of R, G and B characteristic curves showing the relation between a voltage applied to a liquid crystal cell layer 1 and a light transmittance when a voltage is applied to a liquid crystal cell layer 2 in a double-layered-type liquid crystal display device of a second preferred embodiment.
Figure 5B:
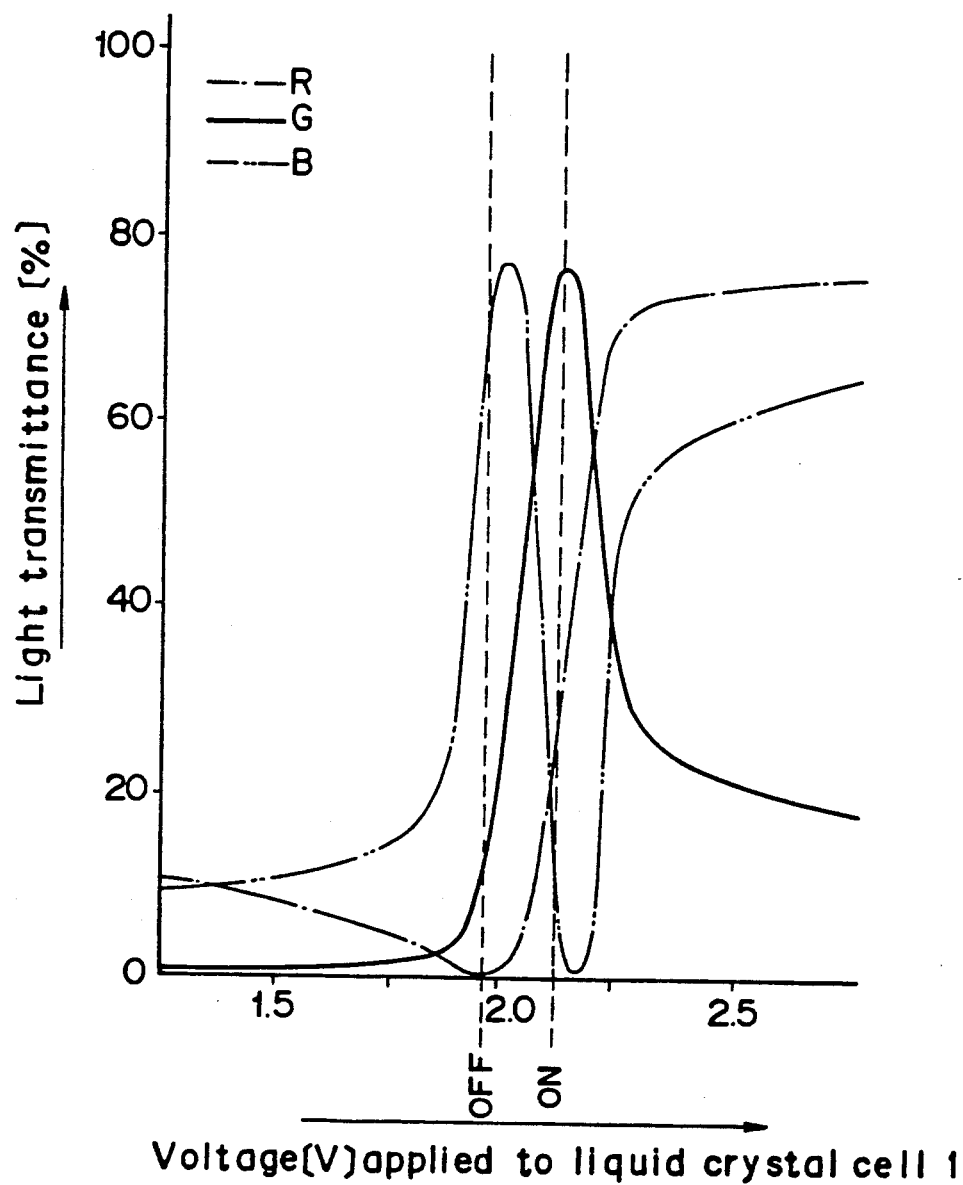
FIG. 5b is a graph of R, G and B characteristic curves showing the relation between a voltage applied to the liquid crystal cell layer 1 and a light transmittance when no voltage is applied to the liquid crystal cell layer 2 in the double-layered-type liquid crystal display device of the second preferred embodiment.

FIG. 5a and 5b are graphs of characteristic curves showing the relation between a voltage applied to a liquid crystal layer 6a of a first cell layer 1 and a light transmittance in a double-layered-type liquid crystal device of a second preferred embodiment according to the present invention, wherein FIG. 5a shows the characteristics in the case of a monochromatic display, and FIG. 5b shows the characteristics in the case of a multicolor display. The double-layered-type liquid crystal device of the second preferred embodiment has a structure similar to that of the first preferred embodiment. Therefore, the composition of the double-layered-type liquid crystal device of the second preferred embodiment will be described below with reference to FIG. 1.

In this double-layered-type liquid crystal device, transparent substrates 3a to 3c are made of glass. After films of ITO having a thickness of about 1500 Å are deposited on the inner surface of the transparent substrate 3a, both the surfaces of the transparent substrate 3b and the inner surface of the transparent substrate 3c by the vapor deposition method, they are etched so as to have desirable patterns, resulting in transparent electrical conductive electrode films 4a to 4d formed thereon. On each of the transparent electrode films 4a to 4d, orientation membranes 5aa, 5ab, 5ba and 5bb of polyimide are formed with a thickness of about 500 Å by a spin coating technique, the surfaces of which are treated by rubbing with cloth, causing the liquid crystal molecules to be in a parallel orientation.

A liquid crystal layer 6a of the first cell layer 1 is made of a liquid crystal ZLI-1691 made by Merck & Co., Inc., to which 0.72 wt % of cholesteryl nonanoate is added as an optically active material. A liquid crystal layer 6b of the second cell layer 2 is made of a liquid crystal ZLI-3449-000 made by Merck & Co., Inc., to which 1.0 wt % of CB-15 is added. The twist direction of the liquid crystal layer 6a is opposite to that of the liquid crystal layer 6b, and the twist angles $\theta_1$ and $\theta_2$ of the liquid crystal layers 6a and 6b are set at 240° and 270°, respectively. The thickness $d_1$ of the first cell layer 1 is about 7 μms, and the thickness $d_2$ of the second cell layer 2 is about 12 μms. Furthermore, the pitch p of the helical twist of the liquid crystal layer 6a is about 14 μms, and that of the liquid crystal layer 6b is about 20 μms. The pretilt angle of each of the liquid crystal arranged between the orientation membranes 5aa and 5ab and the liquid crystal arranged between the orientation membranes 5ba and 5bb are set at about 8°. The polarizers 8a and 8b are made of a compound including iodine, and are formed on the outer surfaces of the outer transparent substrates 3a and 3c so that the polarization axes thereof cross each other at an angle of 30°.

When respective values are set as described above, the aforementioned inequalities (1) to (4) are satisfied. Particularly, when the inequality (4) is satisfied, the ON or OFF voltage is selectively applied to the liquid crystal layer 6a of the first cell layer 1 under the condition that the predetermined voltage is applied to the liquid crystal layer 6b of the second cell layer 2 so as to display a monochromatic image on the double-layered-type liquid crystal device. On the other hand, the ON or OFF voltage is selectively applied to the liquid crystal layer 6a of the first cell layer 1 under the condition that no voltage is applied to the liquid crystal layer 6b of the second cell layer 2 so as to display a multicolor image thereon based on interference colors.

First of all, a method for driving the double-layered-type liquid crystal device so as to display a monochromatic image and the action thereof will be described below with reference to FIG. 5a.

Under the condition that a predetermined voltage applied to the liquid crystal layer 6b of the second cell layer 2, an ON voltage of about 2.0 V or an OFF voltage of about 2.2 V is selectively applied between the transparent electrode films 4a and 4b of the first cell layer 1. Then, the light having passed through the first and second cell layers 1 and 2 passes through the polarizer 8b when the OFF voltage is applied to the liquid crystal layer 6a. On the other hand, the light having passed therethrough is shaded by the polarizer 8b when the ON voltage is applied thereto.

Namely, as shown in FIG. 5a, the red color light R, the green color light G and the blue color light B pass through each partial area of the polarizer 8b corresponding to each of a first group of pixels of the liquid crystal layer 6a to which the OFF voltage is applied, and then, a white color image is displayed on each of the first group of pixels. On the other hand, the red color light R, the green color light G and the blue color light B are shaded by each partial area of the polarizer 8b corresponding to each of a second group of pixels of the liquid crystal layer 6a to which the ON voltage is applied. Then, a black color image is displayed on each of the second group of pixels. Therefore, a monochromatic image composed of white and black color images is displayed on the double-layered-type liquid crystal device.

In the double-layered-type liquid crystal device, the second cell layer 2 acts as a compensator, resulting in an excellent monochromatic display without interference colors in the manner similar to that of the first preferred embodiment.

Next, a method for driving the double-layered-type liquid crystal device so as to display a multicolor image and the action thereof will be described below reference to FIG. 5b.

Under the condition that no voltage is applied to the liquid crystal layer 6b of the second cell layer 2, the ON or OFF voltage is selectively applied to the liquid crystal layer 6a of the first cell layer 1 in the manner similar to the case of the aforementioned monochromatic display. Then, as shown in FIG. 5b, the light transmittance of only the blue color light B on each of a first group of pixels of the liquid crystal layer 6a to which the ON voltage is applied increases. On the other hand, the light transmittance of only the green color light G on each of a second group of pixels of the liquid crystal layer 6a to which the OFF voltage is applied increases. Therefore, a two-color image composed of blue and green color images is displayed on the double-layered-type liquid crystal device.

If the second cell layer 2 is driven statically so as to switch over from such a state that the predetermined voltage is applied to the substantially whole area of the liquid crystal layer 6b to such a state that no voltage is applied thereto, the whole image surface of the double-layered-type liquid crystal device can be switched over from a monochromatic display for selectively displaying a white color image or a black color image thereon to a two-color display for selectively displaying a black color image or a blue color image thereon. Furthermore, by switching over from such a state that the predetermined voltage is applied to the whole area of the liquid crystal layer 6b of the second cell layer 2 corresponding to all the pixels to such a state that no voltage is applied only to a partial area of the liquid crystal layer 6b corresponding to any selected group of pixels with use of a simple multiplex driving method, a two-color image composed of blue and green color images is displayed on the selected group of pixels in such a state that a monochromatic image composed of white and black color images is displayed on the other groups of pixels, resulting in a multicolor display on the whole surface of the double-layered-type liquid crystal device.

Third Preferred Embodiment

Figure 6A:
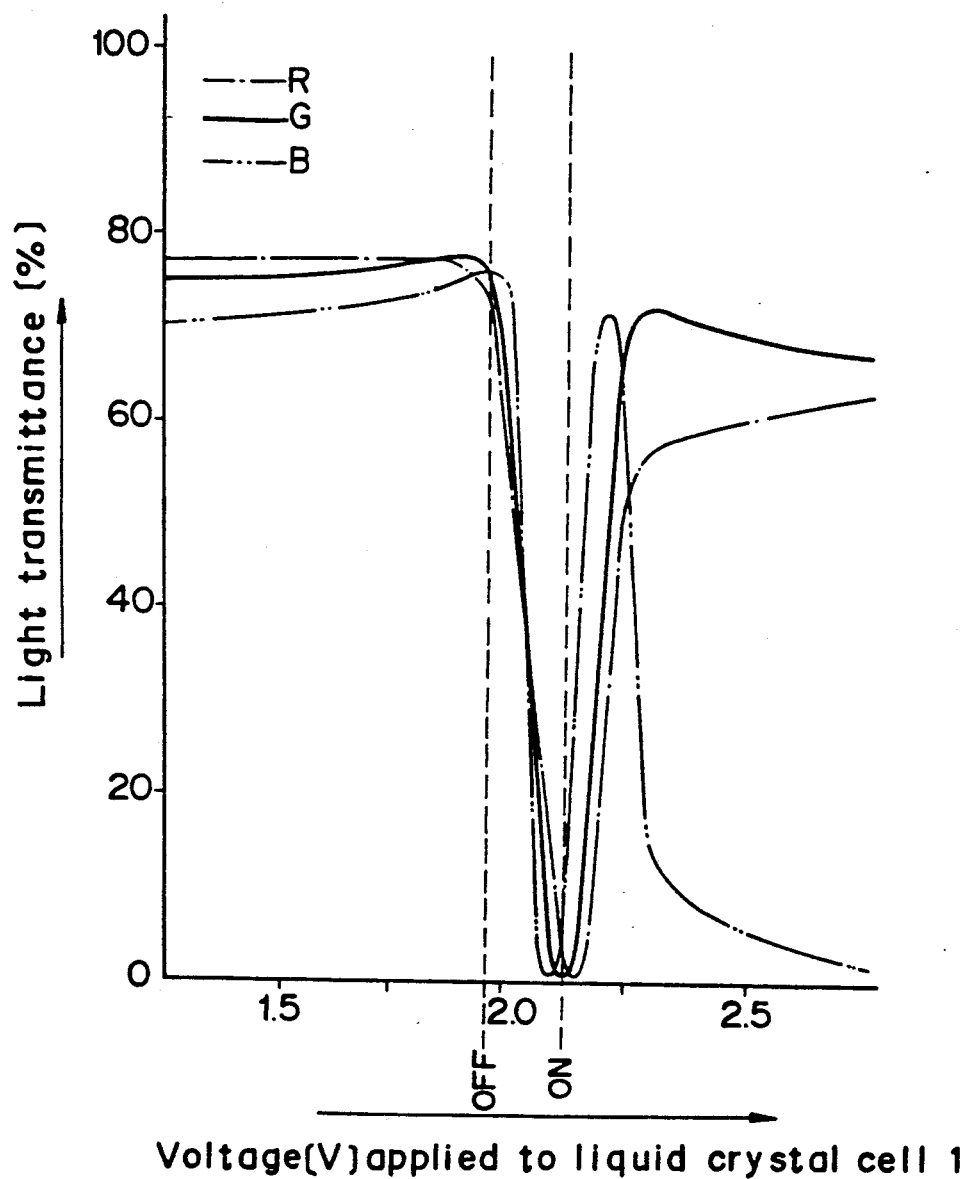
FIG. 6a is a graph of R, G and B characteristic curves showing the relation between a voltage applied to a liquid crystal cell layer 1 and a light transmittance when a voltage is applied to a liquid crystal cell layer 2 in a double-layered-type liquid crystal display device of a third preferred embodiment.
Figure 6B:
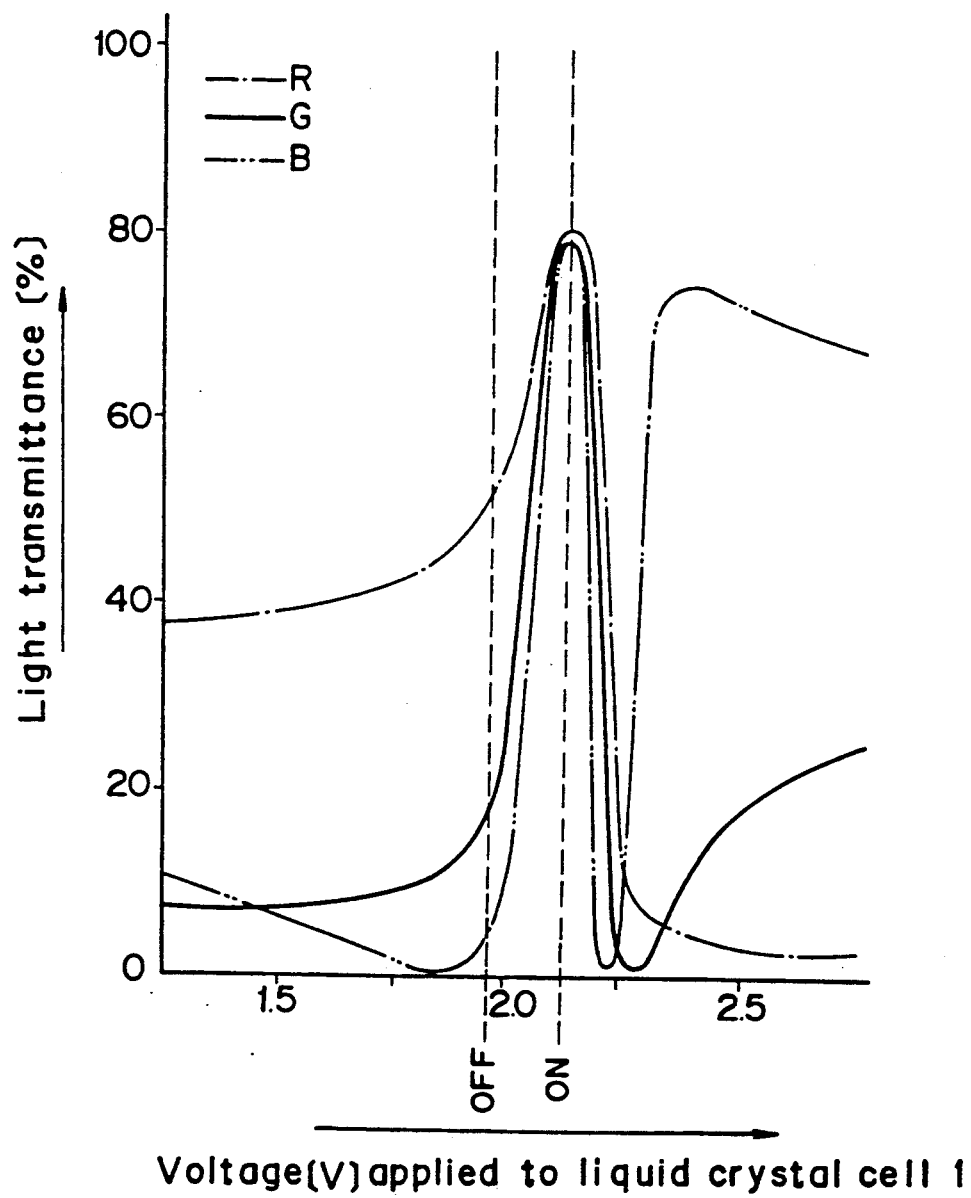
FIG. 6b is a graph of R, G and B characteristic curves showing the relation between a voltage applied to the liquid crystal cell layer 1 and a light transmittance when no voltage is applied to the liquid crystal cell layer 2 in the double-layered-type liquid crystal display device of the third preferred embodiment.

FIGS. 6a and 6b are graphs of characteristic curves showing the relation between a voltage applied to a liquid crystal layer 6a of a first cell layer 1 and a light transmittance in a double-layered-type liquid crystal device of a third preferred embodiment according to the present invention, wherein FIG. 6a shows the characteristics in the case of a monochromatic display, and FIG. 6b shows the characteristics in the case of a multicolor display. The double-layered-type liquid crystal device of the third preferred embodiment has a structure similar to that of the first preferred embodiment. Therefore, the composition of the double-layered-type liquid crystal device of the third preferred embodiment will be described below with reference to FIG. 1.

In this double-layered-type liquid crystal device, the liquid crystal layers 6a and 6b of the first and second cell layers 1 and 2 are made of a liquid crystal ZLI-1691 made by Merck & Co., Inc., wherein 0.63 wt % of cholesteryl nonanoate is added as an optically active material to the liquid crystal layer 6a, and 0.93 wt % of CB-15 is added as the optically active material to the liquid crystal layer 6b. The twist direction of the liquid crystal layer 6a is opposite to that of the liquid crystal layer 6b, and each of the twist angles $\theta_1$ and $\theta_2$ of the liquid crystal layers 6a and 6b is set at 240°. The thickness $d_1$ of the first cell layer 1 is about 8 μms, and the thickness $d_2$ of the second cell layer 2 is about 7.5 μms. Furthermore, the pitch p of the helical twist of the liquid crystal layer 6a is about 16 μms, and that of the liquid crystal layer 6b is about 15 μms. The polarizers 8a and 8b are formed on the outer surfaces of the outer transparent substrates 3a and 3c so that the polarization axes thereof cross each other at an angle of zero, namely, the polarization axes thereof becomes parallel. The other values are set at the same values as that of the second preferred embodiment.

When respective values are set as described above, the aforementioned inequalities (1) to (3) and (5) are satisfied. Particularly, when the inequality (5) is satisfied, the ON or OFF voltage is selectively applied to the liquid crystal layer 6a of the first cell layer 1 under the condition that the predetermined voltage is applied to the liquid crystal layer 6b of the second cell layer 2 so as to display a monochromatic image on the double-layered-type liquid crystal device. On the other hand, the ON or OFF voltage is selectively applied to the liquid crystal layer 6a of the first cell layer 1 under the condition that no voltage is applied to the liquid crystal layer 6b of the second cell layer 2 so as to display a multicolor image thereon based on interference colors.

First of all, a method for driving the double-layered-type liquid crystal device so as to display a monochromatic image and the action thereof will be described below with reference to FIG. 6a.

Under the condition that a predetermined voltage is applied to the liquid crystal layer 6b of the second cell layer 2, an ON voltage of about 2.0 V or an OFF voltage of about 2.2 V is selectively applied between the transparent electrode films 4a and 4b of the first cell layer 1. Then, the light passes through the polarizer 8b when the OFF voltage is applied to the liquid crystal layer 6a. On the other hand, the light is shaded by the polarizer 8b when the ON voltage is applied thereto.

Namely, as shown in FIG. 6a, the red color light R, the green color light G and the blue color light B pass through each partial area of the polarizer 8b corresponding to each of a first group of pixels of the liquid crystal layer 6a to which the OFF voltage is applied, and then, a white color image is displayed on each of the first group of pixels. On the other hand, the red color light R, the green color light G and the blue color light B are shaded by each partial area of the polarizer 8b corresponding to each of a second group of pixels of the liquid crystal layer 6a to which the ON voltage is applied. Then, a black color image is displayed on each of the second group of pixels. Therefore, a monochromatic image composed of white and black color images is displayed on the double-layered-type liquid crystal device.

In the double-layered-type liquid crystal device, the second cell layer 2 acts as a compensator, resulting in an excellent monochromatic display without interference colors in the manner similar to that of the first preferred embodiment.

Next, a method for driving the double-layered-type liquid crystal device so as to display a multicolor image and the action thereof will be described below with reference to FIG. 6b.

Under the condition that no voltage is applied to the liquid crystal layer 6b of the second cell layer 2, the ON or OFF voltage is selectively applied to the liquid crystal layer 6a of the first cell layer 1 in the manner similar to the case of the aforementioned monochromatic display. Then, as shown in FIG. 6b, respective light transmittances of both the red color light R and the green color light G on each of a first group of pixels the liquid crystal layer 6a to which the OFF voltage is applied decrease. Then, a yellow color image is displayed on each of the first group of pixels. On the other hand, the red color light R, the green color light G and the blue color light B pass through each partial area of the polarizer 8b corresponding to each of a second group of pixels of the liquid crystal layer 6a to which the ON voltage is applied. Then, a white color image is displayed on each of the second group of pixels. Therefore, a two-color image composed of yellow and white color images is displayed on the double-layered-type liquid crystal device.

If the second cell layer 2 is driven statically so as to switch over from such a state that the predetermined voltage is applied to the substantially whole area of the liquid crystal 6b to such a state that no voltage is applied thereto, the whole image surface of the double-layered-type liquid crystal device can be switched over from a monochromatic display for selectively displaying a white color image or a black color image thereon to a two-color display for selectively displaying an yellow color image or a white color image thereon. Furthermore, by switching over from such a state that the predetermined voltage is applied to the whole area of the liquid crystal layer 6b of the second cell layer 2 corresponding to all the pixels to such a state that no voltage is applied only to a partial area of the liquid crystal layer 6b corresponding to any selected group of pixels with use of a simple multiplex driving method, a two-color image composed of yellow and white color images is displayed on the selected group of pixels under the condition that a monochromatic image composed of white and black color images is displayed on the other groups of pixels, resulting in a multicolor display on the whole surface of the double-layered-type liquid crystal device.

In the aforementioned present preferred embodiments, the double-layered-type liquid crystal device is described above, however the present invention is not limited to this. The present invention can be applied to a multi-layered-type liquid crystal device.

It s understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable features that would be treated as equivalents thereof by those skilled in the art to which the present invention pertains.

What is claimed is:

1. A method for driving a multi-layered-type liquid crystal display device which includes stacked plural cell layers, each plural cell layer containing liquid crystal molecules twisted between two transparent substrates so as to have a large birefringence $\Delta n_x$, a thickness $d_x$, a twist angle $\theta_x$, wherein x, for birefringence, thickness and twist angle, is an integer corresponding to the cell layer, and having a varying light transmittance varying responsive to a voltage applied thereto, said method comprising the steps of:
determining voltages to be applied to each of the plural cell layers so as to vary the light transmittances of the individual cell layers to pass a predetermined color light, and
driving each of the plural cell layers by applying said determined voltages to corresponding ones of each of the plural cell layers to display an image having the predetermined color light on the liquid crystal display device due to the transmittance of each of the plural cell layers varying responsive to the determined voltages applied thereto.

2. The method as claimed in claim 1,
wherein the voltage applied to at least one of the plural cell layers is fixed, and the voltages applied to the other of the plural cell layers are varied among a plurality of different predetermined voltages.

3. The method as claimed in claims 1 or 2, wherein said liquid crystal display device is a double-layered liquid crystal display device composed of a first and a second cell layer.

4. The method as claimed in claim 3, wherein a relationship between a product of the birefringence $\Delta n_1$, the thickness $d_1$ and the twist angle $\theta_1$ of the first cell layer and a product of the birefringence $\Delta n_2$, the thickness $d_2$ and the angle $\theta_2$ of the second cell layer is set so as to satisfy the following inequality:

$$\Delta n_2 \cdot d_2 \cdot \theta_2 / \Delta n_1 \cdot d_1 \cdot \theta_1 > 0.9, \text{ and}$$

wherein said step of driving further comprises the steps of:
applying a predetermined voltage to the second cell layer in a first applying step; and
applying, selectively in a second applying step, one of a first predetermined voltage and a second predetermined voltage to the first cell layer, thereby displaying a monochromatic image on the liquid crystal display device.

5. The method as claimed in claim 3, wherein a relationship between a product of the birefringence $\Delta n_1$, the thickness $d_1$ and the twist angle $\theta_1$ of the first cell layer and a product of the birefringence $\Delta n_2$, the thickness $d_2$ and the twist angle $\theta_2$ of the second cell layer is set so as to satisfy the following inequality:

$$\Delta n_2 \cdot d_2 \cdot \theta_2 / \Delta n_1 \cdot d_1 \cdot \theta_1 > 0.9, \text{ and}$$

wherein said step of driving further comprises the steps of:
applying zero voltage to the second cell layer in a first applying step; and
applying, selectively in a second applying step, one of a first predetermined voltage and a second predetermined voltage to the first cell layer, thereby displaying a two-color image on the liquid crystal display device.

6. The method as claimed in claim 3, wherein a relationship between a product of the birefringence $\Delta n_1$, the thickness $d_1$ and the twist angle $\theta_1$ of the first cell layer and a product of the birefringence $\Delta n_2$, the thickness $d_2$ and the twist angle $\theta_2$ of the second cell layer is set so as to satisfy the following equality:

$$\Delta n_2 \cdot d_2 \cdot \theta_2 / \Delta n_1 \cdot d_1 \cdot \theta_1 < 1.1, \text{ and}$$

wherein said step of driving further comprises the steps of:
applying zero voltage to the second cell layer in a first applying step; and
applying, selectively in a second applying step, one of a first predetermined voltage and a second predetermined voltage to the first cell layer, thereby displaying a monochromatic color image on the liquid crystal display device.

7. The method as claimed in claim 3, wherein a relationship between a product of the birefringence $\Delta n_1$, the thickness $d_1$ and the twist angle $\theta_1$ of the first cell layer and a product of the birefringence $\Delta n_2$, the thickness $d_2$ and the twist angle $\theta_2$ of the second cell layer is set so as to satisfy the following inequality:

$$\Delta n_2 \cdot d_2 \cdot \theta_2 / \Delta n_1 \cdot d_1 \cdot \theta_1 < 1.1, \text{ and}$$

wherein said step of driving further comprises the steps of:
applying a predetermined voltage to the second cell layer in a first applying step; and
applying, selectively during a second applying step, one of a first predetermined voltage and a second predetermined voltage to the first cell layer, thereby displaying a two-color image on the liquid crystal display device.

8. The method as claimed in any one of the claims 1 or 2,
wherein an absolute value of a product of the birefringence $\Delta n_2$ and the thickness $d_1$ of the first cell layer is set so as to satisfy the following equality:

$$1.0 < |\Delta n_1 \cdot d_1| < 3.5,$$

and an absolute value of a product of the birefringence $\Delta n_2$ and the thickness $d_2$ of the second cell layer is set so as to satisfy the following inequality:

$$1.0 < |\Delta n_2 \cdot d_2| < 3.5.$$

9. The method as claimed in any one of the claims 1 or 2,
wherein a ratio of a product of the birefringence $\Delta n_2$ and the thickness $d_2$ of the second cell layer to the product of the birefringence $\Delta n_1$ and the thickness $d_1$ of the first cell layer is set as to satisfy the following inequality:

$$0.8 < \Delta n_2 \cdot d_2 / \Delta n_1 \cdot d_1 < 1.5.$$

10. The method as claimed in any one of the claims 1 or 2,
wherein the twist angle of the first cell layer is set so as to fall within the range of 180° to 360° and
the twist angle of the second cell layer is set so as to fall within the range of 150° to 360° and to be different from that of the first cell layer.

11. The method as claimed in any one of the claims 1 or 2,
wherein a ratio of the thickness d of each of the first and second cell layers to a helical pitch p of the liquid crystal therein is set so as to satisfy the following inequality under a condition that a pretilt angle of the liquid crystal thereof is at most 10°:

$$\theta/360° - \tfrac{1}{4} < d/p \leq \theta/360°,$$

wherein $\theta$ is the twist angle of the liquid crystal in each of the first and second cell layers.

* * * * *